United States Patent [19]

Oguchi

[11] Patent Number: 4,545,014
[45] Date of Patent: Oct. 1, 1985

[54] INFORMATION PROCESSING APPARATUS
[75] Inventor: Tetsuji Oguchi, Tokyo, Japan
[73] Assignee: Nippon Electric Co., Inc., Tokyo, Japan
[21] Appl. No.: 325,086
[22] Filed: Nov. 25, 1981
[30] Foreign Application Priority Data
Nov. 26, 1980 [JP] Japan .................................. 55-166297
[51] Int. Cl.⁴ .............................................. G06F 9/00
[52] U.S. Cl. .................................................. 364/200
[58] Field of Search ............................... 364/200, 900
[56] References Cited
U.S. PATENT DOCUMENTS 4,044,240  8/1977  Cox, Jr. et al. ...................... 364/300
4,166,945  9/1979  Inoyama et al. ..................... 364/900
4,315,330  2/1982  Brickoian et al. ................... 364/514

Primary Examiner—Gareth D. Shaw
Assistant Examiner—John G. Mills
Attorney, Agent, or Firm—Sughrue, Mion, Zinn, Macpeak, and Seas

[57] ABSTRACT

An information processing apparatus employs first and second direct memory access controllers which cooperate during transfer of information between first and second devices, e.g. memories. The first controller controls information transfer from the first memory to the second controller and the second controller transfers the information from its own internal storage to the second memory while simultaneously receiving further information under the control of the first controller. The second controller includes address control circuitry for high speed generation of non-sequential addresses for writing into the second memory.

1 Claim, 8 Drawing Figures

INFORMATION PROCESSING APPARATUS

BACKGROUND OF THE INVENTION

The present invention relates to an information processing apparatus and, more particularly, to an apparatus which executes an information transfer.

The transferring of information from one unit to another unit is an important element in many information processing apparatuses. Information transfer is very frequently performed in the information processing apparatus comprising a memory unit, a central processing unit (CPU), and a peripheral unit or peripheral control unit. The information transfer, in the early days of the computers, was performed only under control of the CPU. In such a case, a CPU executes the information transfer processing in accordance with a program. For executing the transfer processing by the CPU a time period of one information transfer was very long, for example, 42 clocks. This is a serious problem in an apparatus requiring the data transfer at a high speed such as an image processing system.

On the other hand, a direct memory access (DMA) unit is well known as a data transfer control unit which executes a data transfer without using a CPU. This control unit can execute a data transfer from one unit to another unit in about 4 to 5 clocks. However, this control unit has to control the one and the other units at different timings, and therefore when a larger number of data must be transferred, or an address of the transfer unit is different from an address of the receiver unit, the operation of the control unit is very complicated. Additionally, in these cases, the speed of the data transfer is slow so that the control unit can not be used in the image processing system in which a high-speed data transfer is required.

SUMMARY OF THE INVENTION

A principle object of the present invention is to provide an information processing apparatus which allows a high speed data transfer.

Another object of the present invention is to provide an information processing apparatus which is well adaptable for information transfer between the units requiring an address designation.

Yet another object of the present invention is to provide an information processing apparatus which is well adaptable for a system in which addresses of an information transfer unit are different from addresses of an information receiver unit.

An information processing apparatus of the present invention comprises an information transfer unit having information to be transferred, an information receiver unit, a first control unit coupled to the transfer unit for reading out information of the transfer unit, a storing unit for temporarily storing the read-out information from the transfer unit, and a second control unit coupled to the receiver unit for writing the read-out information which is stored in the storing unit to the receiver unit in the period of time when an information of the transfer unit is read out and is transferred into the storing unit.

According to the present invention, at least two information transfer control units are provided for a transfer unit and a receiver unit. Further, an information storing unit for temporarily storing transferred information is prepared between the transfer unit and the receiver unit. As a result, the operation to read an information out of the transfer unit and transfer it into the storing unit for storing, and the operation to write in the receiver unit the information which has been temporarily stored in the storing unit can be executed in parallel. Therefore, the present invention can speed up the information transfer.

Further, the operation for reading information out of the transfer unit and the operation for writing the read-out information in the receiver unit are independently executed by the first control unit and the second control unit, respectively. Accordingly, the addresses for the transfer unit and the receiver unit can be designated separately by the first and the second control units. This is very useful in the case that the address of the transfer unit is different from the address of the receiver unit.

The foregoing and other objectives, features and advantages of the present invention will be more readily understood upon consideration of the following detailed description of certain preferred embodiments of the invention, taken in conjunction with the accompanying drawings.

DESCRIPTION OF THE PRIOR ART

Figure 1:
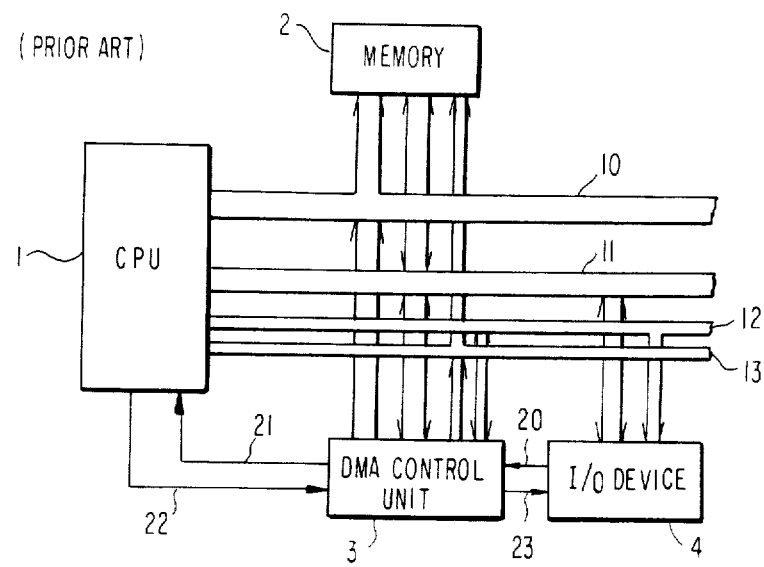
FIG. 1 is a block diagram showing a prior art information processing apparatus for executing a memory-I/O device DMA transfer.
Figure 2:
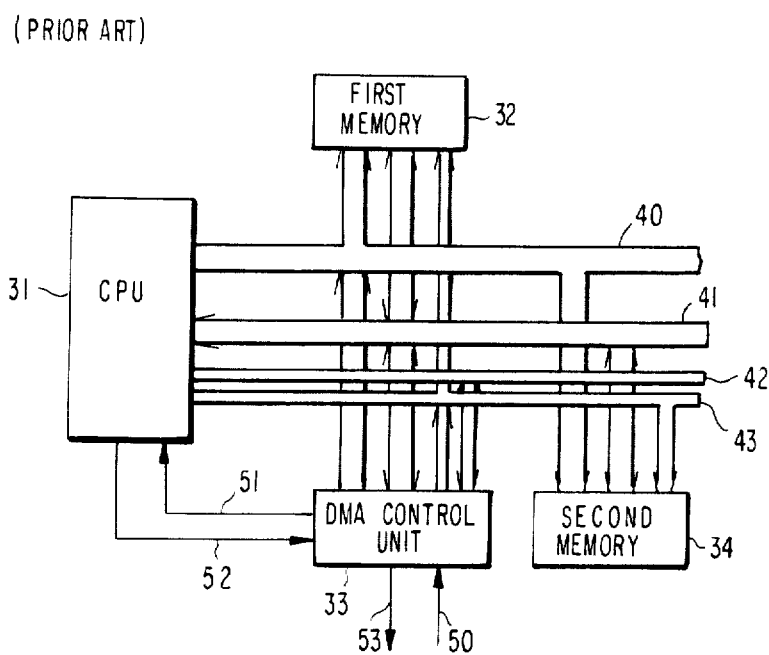
FIG. 2 is a block diagram showing another prior art information processing apparatus with a DMA transfer circuit for a memory-memory DMA transfer.

An information processing apparatus having the direct memory access (DMA) means, which has been proposed recently, is an effective means for an information transfer. Block diagrams of conventional information processing apparatus with a DMA transfer means are illustrated in FIGS. 1 and 2. The operations of those apparatuses are as follows. The term "DMA transfer" means an information (such as data, instructions, commands, etc.) transfer directly performed between the memory unit and the peripheral unit, not under control of the CPU. Accordingly, a processing apparatus with a DMA transfer means is provided with a DMA control unit.

FIG. 1 shows a block diagram of an information processing apparatus with a DMA control unit in the prior art. In the apparatus, a DMA transfer is performed between the memory unit and the peripheral unit or the peripheral control unit (referred to as an I/O device). The apparatus includes a CPU1, a memory 2, a DMA control unit 3 and an I/O device 4. The CPU1 and the memory 2 are coupled to each other by an address bus 10 and a data bus 11. A first control signal bus 13 for directing timing in the data read-out and data write-in operations is coupled to the CPU1 and the memory 2. Meanwhile, since the I/O device 4 has no address, there is no need for address designation for the I/O device 4. Therefore, the I/O device is only coupled to the data bus 11. The DMA control unit 3 is coupled to the address bus 10, the data bus 11, and the control signal bus 13. The CPU1, the DMA control unit 3 and the I/O device 4 are interconnected by means of a second control signal bus 12.

In the data transfer from or to the memory 2, its address is designated by necessity. As for the I/O device 4, there is no need for the address designation. How data is transferred between the memory 2 and the I/O device in a DMA mode will be described.

Upon request of the data transfer, the I/O device 4 transfers a DMA request signal 20 to the DMA control unit 3. Upon receipt of the signal 20, the DMA control unit 3 applies a hold request signal (HOLD) on line 21 for holding an operation of the CPU1. The CPU1 judges whether the hold request signal (HOLD) is present or not at the end of an instruction cycle (or a machine cycle) and, when it is present, gives control of the buses to the DMA control unit 3. Further, the CPU1 separates the address bus 10, the data bus 11 and the second control signal bus 12 from the CPU itself. Then the HOLD permission signal 22 is transferred to the DMA control unit 3 from the CPU1. As a result, the DMA control unit couples to the address bus and the control signal buses in preparation for the DMA transfer mode. Further, it indicates to the CPU1 that the DMA is currently being executed and transfers a DMA acknowledge signal 23 to the I/O device 4.

Figure 4:
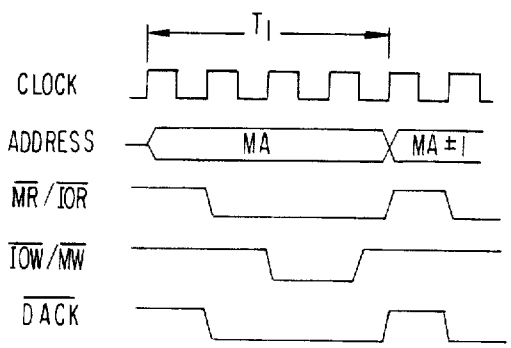
FIG. 4 shows timing diagrams for explaining the operation of the apparatus shown in FIG. 1.

FIG. 4 shows timing diagrams of various signals generated from the DMA control unit 3. Memory control signals (a read-out control signal MR and a write control signal MW) and I/O device control signals (a read out control signal IOR and a write control signal IOW) in the data transfer from the memory 2 to the I/O device 4, are different from those in the data transfer from the I/O device 4 to the memory 2.

The DMA data transfer from the memory 2 to the I/O device 4 will be described referring to FIG. 4. In response to the first clock, the DMA control unit 3 transfers address data (MA) to the memory 2. The address data is transferred through the address bus 10 to the memory 2. In response to the next clock, the memory read signal (MR) is produced to the first control signal bus 13. As a result, the content at the designated memory location is produced onto the data bus 11. Then, a write signal (IOW) is transferred through the second control signal bus to the I/O device 4. Accordingly, data is written into the I/O device 4 to which the DMA acknowledge signal (DACK) 23 is applied, so that the DMA transfer of one byte of data at the memory location designated by the address is completed for in four clocks (period T1). when the DMA transfer of a number of bytes is performed, the address data in the DMA control unit 3 is sequentially incremented or decremented, after the respective byte is transferred in the DMA mode.

In the DMA transfer between the memory 2 and the I/O device 4, the above-mentioned operations are time-controlled by the clock pulses. Therefore, according to this apparatus, the data transfer of one byte is executed during four clocks (perido T1). Compared with the data transfer under the program control by the CPU, this DMA data transfer can improve the transfer speed ten times or more.

However, the DMA transfer means, when data is transferred between the memories rather than between a memory and an I/O device, has a problem that the address designation is required for both the memories in the receiving and transmitting sections as will now be described in more detail.

Turning now to FIG. 2, there is shown a block diagram of an information processing apparatus comprised of a first memory 32, a second memory 34, a CPU 31 and a DMA control unit 33. An address bus 40 and a data bus 41 are arranged so that the CPU 31 executes the data transfer between the first and second memories 32 and 34. Reference numeral 42 designates a first control signal bus coupled to the I/O device (not shown). The first and second memories 32 and 34 are coupled to a second control bus 43 so that the CPU 31 controls the reading and writing of data. The DMA control unit 33 is so coupled as to transfer data and control signals to the address but 40, the data bus 41 and the first and second control signal buses 42 and 43.

When a DMA request signal 50 for data to be DMA-transferred from the first memory 32 to the second memory 34 is applied to the DMA control unit 33, the DMA control unit 33 applies a hold request signal (HOLD) 51 to the CPU 31. The CPU 31 judges whether the hold request signal is present or not at the end of the instruction cycle. At this time, if the hold request signal is present, the CPU 31 gives a usage right of the address bus 40, the data bus 41, and the first and second control signal buses 42 and 43 to the DMA control unit 33. Further, the CPU 31 transfers a permission signal 52 to the DMA control unit 33. Upon receipt of the permission signal 52, the DMA control unit transfers a DMA acknowledge signal 53 to the unit which has issued the request for the DMA transfer. In this way, the data transfer processing is started by the DMA control unit.

Figure 5:
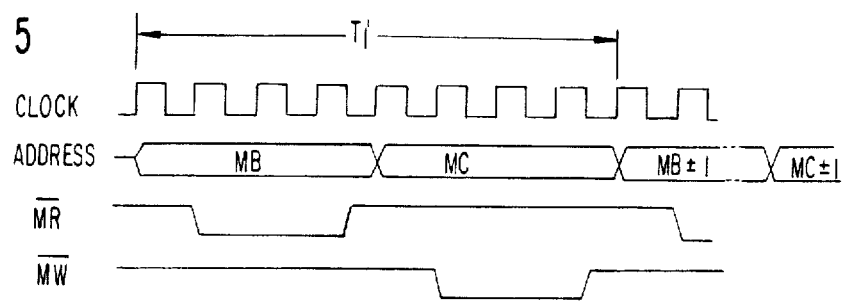
FIG. 5 shows timing diagrams for explaining the operation of the apparatus shown in FIG. 2.

FIG. 5 shows timing diagrams for data transfer from the first memory 32 to the second memory 34 in the DMA mode.

Firstly, the DMA control unit 33 applies address data (MB) for the first memory 32 toward the address bus 40, and then applies a first memory read-out control signal (MR) to the control bus 43. Then, the content of the first memory 32 is read out onto the data bus 41 and is temporarily stored in a register (not shown) in the DMA control unit 33. Subsequently, the DMA control unit 33 transfers address data (MC) to the second memory 34. The address data is supplied through the address bus 40 to the second memory 34. Further, a write control signal (MW) for the second memory is transferred to the bus 43, while at the same time the contents of the first memory, which has been stored in the DMA control unit 33, are loaded into the second memory 34 by way of the data bus 41. In this way, the DMA transfer of one byte is completed. For executing the DMA transfer of a number of bytes, an address of the transceiver memory and an address of the receiver memory are automatically incremented or decremented by only one DMA control unit 33.

Thus, in the DMA transfer system shown in FIG. 2, addresses (MB and MC) of both memories must be designated by one DMA control unit 33. Further, since one address bus is commonly used, the times for accessing the memories must be made different. For this reason, in the prior art DMA transfer means, eight clocks (period T1′ = 2 T1) are required for transferring the data of one byte from one memory to another memory. This prevents a high speed data transfer. Further, the operation of separately generating addresses of a receiver memory and addresses of a transceiver memory is very complex.

An embodiment of an information processing apparatus with DMA transfer means according to the present invention will be described referring to the accompanying drawings.

DETAILED DESCRIPTION OF THE PREFERRED EMBODIMENT

Figure 3:
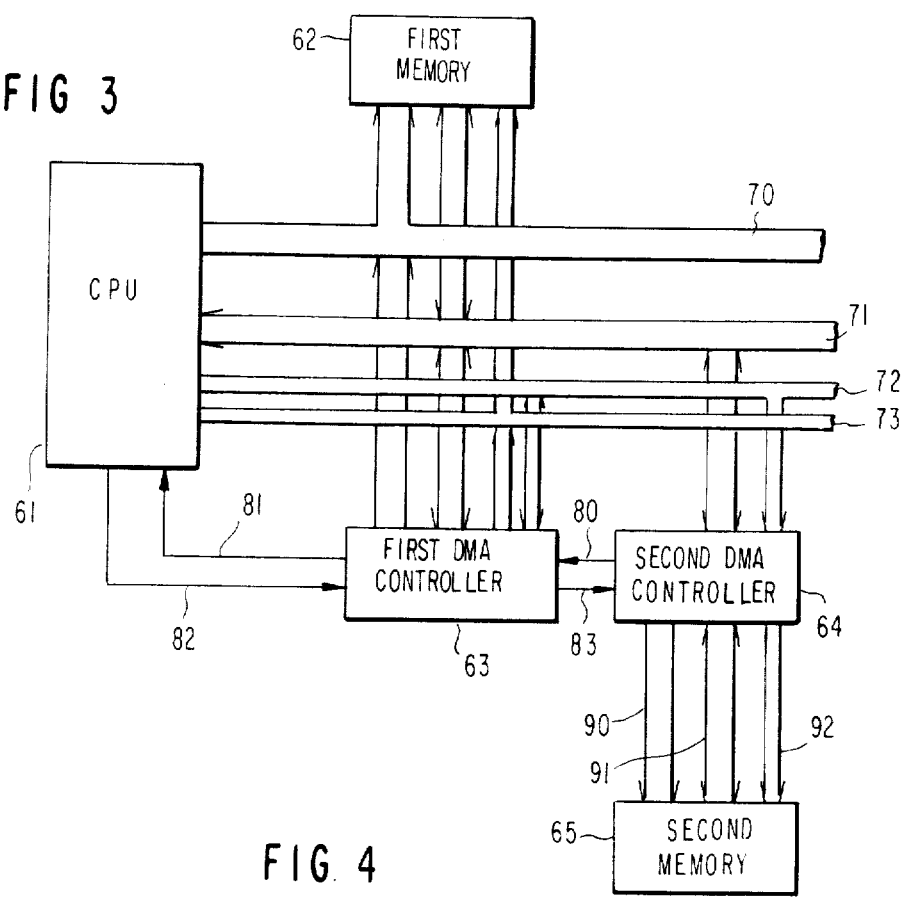
FIG. 3 is a block diagram showing an embodiment of an information processing apparatus according to the present invention.

FIG. 3 shows a functional block diagram of an information processing apparatus which is a preferred embodiment according to the present invention. In this embodiment, main equipment are a central processing unit (CPU) 61, first and second memories 62 and 65, and first and second DMA (direct memory access) controllers 63 and 64. The CPU 61 is coupled to the first memory 62 by means of an address bus 70 and data bus 71. First DMA controller 63 is so arranged as to be coupled to the address bus 70 and may be coupled to the data bus 71. The second DMA controller 64 is coupled to the data bus 71. The second memory 65 is coupled to the second DMA controller 64 by means of an address bus 90 and a data bus 91. The CPU 61 and the first DMA controller 63 can access the first memory 62 through a first control signal bus 73. Further, the CPU 61 can control the first and second DMA controllers 63 and 64 through a second control signal bus 72. Particularly, the first DMA controller 63 is coupled to the second control signal bus 72 by means of a bidirectional bus. The second DMA controller 64 can control the timing of data read-out and write operations to and from the second memory 64, through a third control signal bus 92. When viewed from the CPU 61 and the first DMA controller 63, the second DMA controller 64 is considered as an I/O device or an I/O device controller. Accordingly, the second control signal bus 72 is equivalent to the conventional I/O control signal bus (the bus 12 in FIG. 1).

The explanations to follow is of a procedure wherein the second DMA controller 64 operating as the I/O device performs a DMA transfer with the first memory 62.

The second DMA controller 64 transmits a DMA request signal 80 to the first DMA controller 63. When receiving the DMA request signal, the first DMA controller 63 transfers a signal (HOLD) 81 requesting the CPU 61 to hold its operation. The CPU 61 judges whether a HOLD signal is present or not at the end of each instruction cycle. When the HOLD signal is present, the CPU 61 separates from CPU itself the address bus 70, the data bus 71, and the first and second control signal buses 72 and 73. In other words, the CPU 61 gives the first DMA controller 63 a bus usage right to use the respective buses. The CPU 61 transfers a signal 82 acknowledging the DMA transfer to the first DMA controller 63. Upon receipt of the signal 82, the first DMA controller 63 transfers a DMA acknowledgement signal 83 to the second DMA controller 64. The bus separation may be realized by putting an input/output terminal of a TTL buffer in an input/output stage of the CPU 61, for example, in a floating state (high impedance state). Under this condition, the first DMA controller 63 transfers a leading address to the first memory 62 to control the writing of data transferred from the second DMA controller 64 to the first memory 62. Alternatively, data is read out from the first memory 62 and is written into a register (not shown) of the second DMA controller 64. This is realized in a manner that the first DMA controller 63 transfers a read-out or write signal to the first memory 62 and the second DMA controller 64 by way of the buses 73 and 72. In this way, the DMA transfer is performed between the second DMA controller serving as the I/O device and the first memory during a period of only 3 or 4 clocks. The speed of the data transfer is extremely high, as described above.

Next, explanation will be given about a DMA transfer between the first and second memories 62 and 65 which can not be made at a high speed by the prior art system. When it is required to transfer data between the first and second memories 62 and 65, the second DMA controller 64 produces a DMA transfer request signal 80 and the first DMA controller 63 obtains a right to use the buses from the CPU 61 in a procedure as mentioned above.

Figure 6:
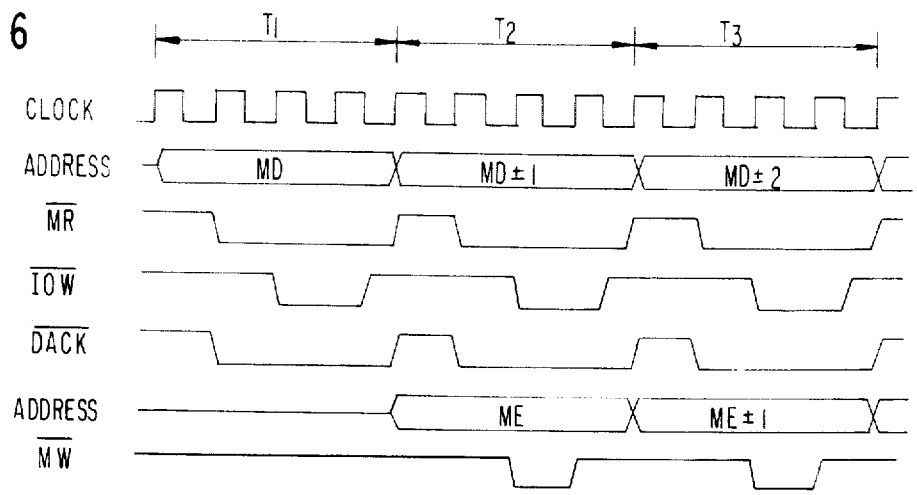
FIG. 6 shows timing diagrams for explaining the operation of the apparatus shown in FIG. 3.

FIG. 6 shows timing diagrams for data transfer from the first memory 62 to the second memory 65.

The first DMA controller 63 transfers address data (MD) to the first memory 62. The leading address data is assumed to be that pregiven by the CPU 61 at the initial stage of the DMA transfer process. The DMA controllers 63 and 64 have a counter for performing increment, decrement or modification of an address of memories 62 and 65. The first DMA controller 63 transfers a read out control signal (MR) to the first memory 62, by way of the first control signal bus 73. As a result, the designated data is read out from the memory 62 and applied to the data bus 71. At the next timing, the first DMA controller 63 transfers a data write control signal (IOW) to the second DMA controller 64, through the bus 72. The data read-out from the first memory 62 is stored in a register in the second DMA controller 64 during this period. The number of clocks used up to this stage of the processing is four. During a period T1 of the four clocks, the data is read out of the first memory 62, transferred to the second DMA controller 64, and stored therein. The period is also equal to the DMA transfer period between the memory and I/O device in the prior DMA transfer system, as shown in FIG. 4.

In response to the first clock during the next period T2, the address data (MD) supplied from the first DMA controller 63 to the first memory 62 is incremented (or decremented) by one and is supplied as MD ±1 to the first memory 62. In response to the next clock, the first DMA controller 63 transfers a read-out control signal (MR) to the first memory 62 to read out data designated by the next address (MD ±1) from the first memory 62. In synchronism with the succeeding clock, the first DMA controller 63 produces a write control signal (IOW) toward the second DMA controller 64. In response to the first clock during this period, the second DMA controller 64 transfers an address (ME) to the second memory 65. At the same time as the first DMA controller 63 transfers a write control signal (IOW) to the second DMA controller 64, the second DMA controller 64 transfers a write control signal (MW) to the second memory 65. At the time overlapping the time that the data read out from the first memory 62 is written into the second DMA controller 64, the data previously stored in the second DMA controller 64 is written into the second memory 65 (a period T2 in FIG. 6). During the succeeding period T3, a similar processing is executed and the data of the first memory 62, designated by an address (MD±2) is stored in the second DMA controller 64, and at the same time the data of the first memory, designated by the address (MD ±1) previously stored in the second DMA controller 64, is written into the second memory 65.

As a result, when the DMA transfer is executed between the first memory 62 and the second memory 65 during the sequential periods, two datas are transferred during the same period of those periods T2, T3, ..., as shown in FIG. 6, so that memory to memory data transfer speed is substantially doubled, compared to the prior art DMA transfer means.

Figure 8:
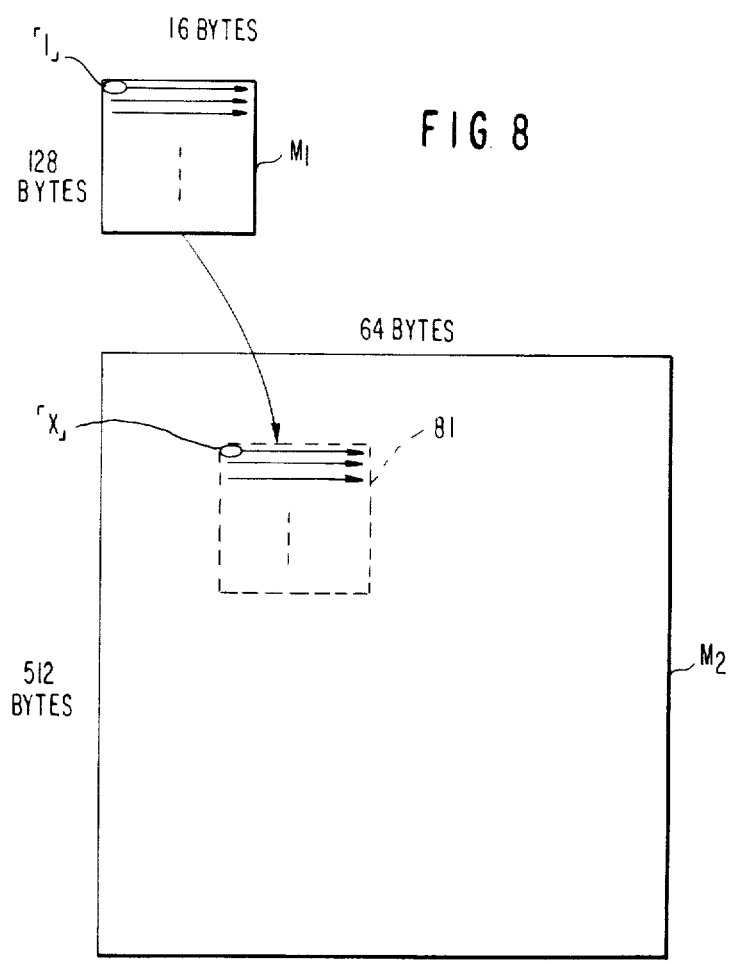
FIG. 8 shows memory block diagrams illustrating arrangements of addresses of memories in the memory-memory data transfer.
Figure 7:
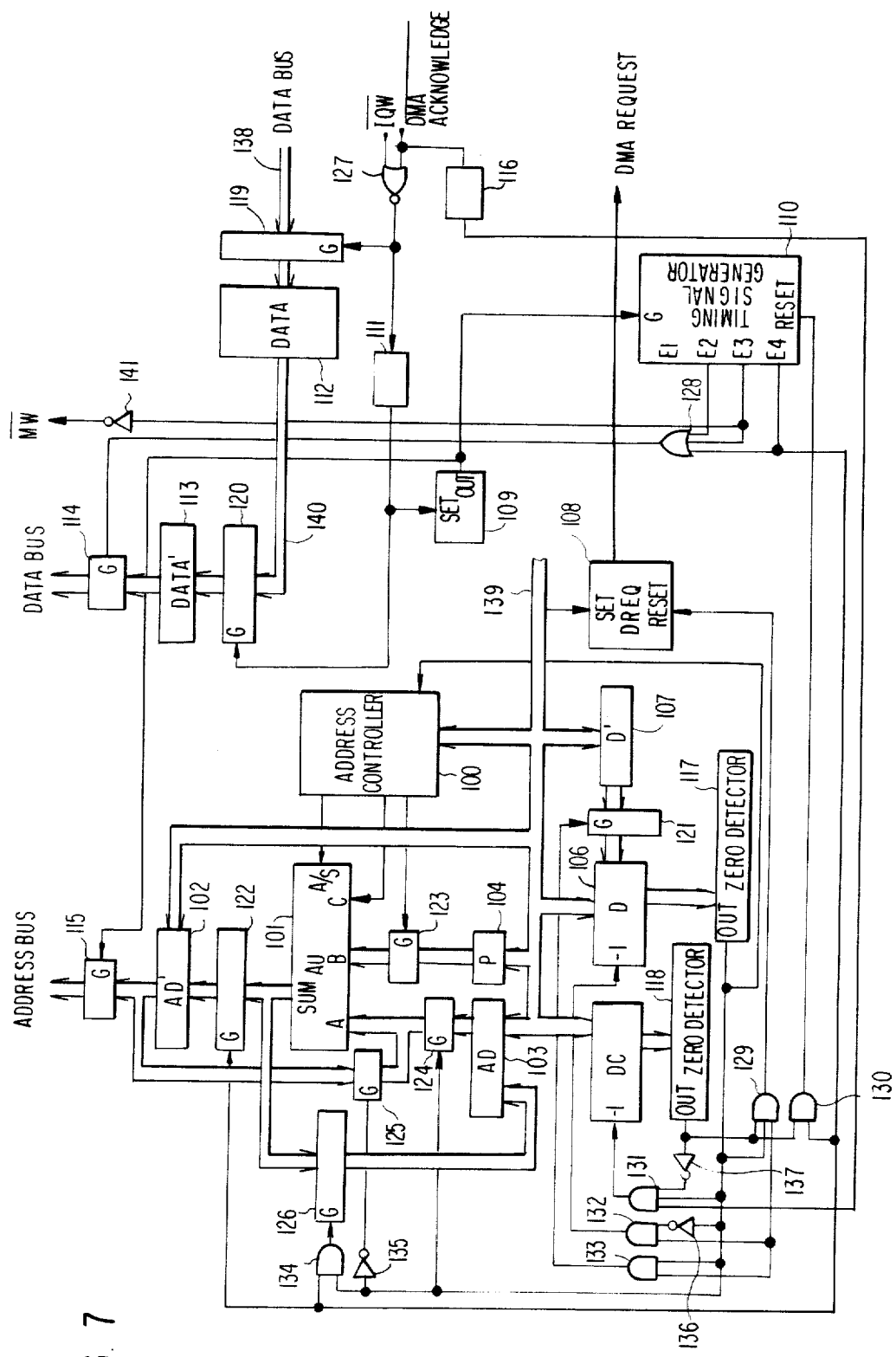
FIG. 7 is a block diagram of an example of a second DMA controller shown in FIG. 3.

The present embodiment of a DMA transfer system according to the present invention will be described in more detail referring to FIG. 7 illustrating a circuit diagram of a practical arrangement of the second DMA controller in the embodiment. A case which will be employed for explaining the operation of the system is one in which data is transferred from the first memory to the second memory in a DMA transfer mode. The first and second memories are related such that addresses are arranged in the memory as shown in FIG. 8. As shown, 16 bytes (horizontal)×128 bytes (vertical) are arranged in the first memory M1 and 64 bytes (horizontal)×512 bytes (vertical) are arranged in the second memory M2. One byte means a plurality of bits in a plurality of memory locations designated by one address data. If a memory having a memory area of 4 bits per byte is employed, the first memory M1 has a capacity of 16×4=64 bits in the horizontal direction and 128×4=512 bits in the vertical direction. When the first address in the first memory M1 is designated, the first horizontal 4-bit data in the left uppermost address is read out. When the second address is designated, the succeeding horizontal 4-bit data on the same line in the horizontal direction is read out. When the 17th address is designated, the first 4-bit data on the second line is read out. In this way, by continuously addressing the first to 2048th addresses all the data in the first memory M1 are read out. The address designation for writing data into the first memory M1 may be executed in a similar way. The second memory M2 has a large capacity, 64×4=256 bits in the horizontal direction and 512×4=2048 bits in the vertical direction. The addresses alloted to the second memory M2 range from the first to 32768th addresses. Let us consider a case where the data in the first memory M1 is transferred into a memory area 81 indicated by a dotted line in the second memory M2. In this case, all the data are read out from the first memory M1 by sequentially incrementing one by one the addresses from the first address. However, it is impossible to write data into the dotted line area of the second memory M2 even if the address is sequentially incremented one by one as in the case of the first memory. By convention, such memory data transfer is processed by software, consuming a long time, since it can not be controlled by hardware. The process by software is problematic particularly in processing an image or character pattern. In this case, the entirety of the second memory M2 corresponds to a screen of a CRT. Further, one bit of the second memory M2 corresponds to one picture element on the CRT screen. Meanwhile, the picture data processed by the CPU is temporarily stored in the first memory M1. It is assumed that the data from the memory M1 is written into a given memory area 81 of the second memory M2, thereby setting the modified picture data of one frame in the second memory M2. The modified one-frame picture data set in the second memory M2 is sequentially transferred to a CRT display section to be visualized by the corresponding picture elements. Accordingly, when the data edited in the first memory M1 are sequentially written into the second memory M2 from the first to the subsequent addresses in the order of the arranged addresses, the address stepping for the respective memories can be made by merely incrementing one by one. The address stepping method is ineffective for changing an image in a specific memory area (e.g. the area 81) on the screen. In writing data from the first memory M1 to the second memory M2 by using the prior art DMA transfer means, the DMA transfer is stopped every 16 bytes, and the DMA transfer start address and the total number of the bytes must be set again. Therefore, the transfer time is increased and this is a serious problem. Even if the data transfer is subjected to a program process by software so that the data in the first memory is accurately written into the second memory, undesirable phenomenon such as flicker takes place in the picture on the screen unless the program is processed at a very high speed. It is too difficult for the conventional software technology to make the high speed process. On the other hand, the DMA controller shown in FIG. 7 of the present embodiment can modify the picture data (write the data into the second memory M2) very simply and at very high speed.

The function and operation of the DMA controller will be described hereinafter.

FIG. 7 shows a circuit diagram of the second DMA controller shown in FIG. 3. Before the execution of the DMA transfer instruction, the CPU (61 in FIG. 3) sets a DMA start address for the second memory M2 (corresponding to the memory 65 in FIG. 3) in registers AD103 and AD'102, through an internal data bus 139. The number of addresses (16 in the present embodiment) arranged in a row direction (horizontal direction) in the broken line area 81 of the second memory M2 shown in FIG. 8 are set in the registers D106 and D'107. A numeral (the number of addresses in the horizontal direction in the second memory M2 of the present embodiment), which is used when a discontinuous address operation is executed, is set in the register P104. Further, the number of addresses (128 in the present embodiment) in the column direction (vertical direction) in the broken lined area of the second memory M2 shown in FIG. 8 is set in the register DC105. The DC registers 105 and 106 have a decrement function (−1 operation). Every time a signal is applied to −1 input terminals of the registers, the contents of the registers are decremented by 1. Zero detectors 118 and 117 are coupled to the DC registers 105 and 106, respectively. The zero detectors 117 and 118 each produce an "L" level signal when the contents of the registers are not zero, and an "H" level signal when the contents are zero. The signal is applied to AND gates 129 to 134 and inverters 135 to 137. Those gate circuits 129 to 137 respond to input states of the signals to produce timing signals for executing various controls; a decrement control for the D and DC registers, a control for transferring the contents of the register D'107 to the register D106, a control of a signal (an output signal from the AND gate 129) for directing the termination of the DMA transfer, a control of a reset signal (an output signal from the AND gate 130) to a timing signal generator 110, a transfer control (enabling and disabling of the gates 124 and 125) of the result of the address operation, a selection control of the registers, and a control of the address operation. An address operation unit AU101 executes the following arithmetic operations by instructions issued from an address control circuit 100.

| | |
|---|---|
| (1) AD ± P → AD, AD' | (Add/subtract the contents of the AD register and the P register, and set the result of the operation to the AD or AD' register.) |
| (2) AD ± 1 → AD, AD' | (Increment (+1) or decrement (−1) the contents of the AD register, and set the result of the operation in the AD or AD' register.) |
| (3) AD ± P ± 1 → AD, AD' | (Add the contents of the AD register and the P registers and further add 1 to the result of the addition or subtract the contents of the P register from that of the AD register and further subtract 1 from the result of the subtraction, and then set the result of the addition or the subtraction to the AD register or AD' register.) |
| (4) AD' ± P → AD' | (Add or subtract the contents of the AD' register and the P register, and set the result of the addition or subtraction in the AD' register.) |
| (5) AD' ± 1 → AD' | (Increment or decrement by 1 to or from the contents of the AD' register and set the result of the arithmetic operation to the AD' register.) |
| (6) AD' ± P± 1 → AD' | (Add the contents of the AD' register and the P register and further add 1 to the result of the addition or subtract the contents of the AD' register from the contents of the P register and further subtract 1 from the result of the subtraction, and then set the result of the subtractions in the AD'register.) |

The above arithmetic operations are used by the address operation unit AU101 to define the memory locations in the second memory M2 shown in FIG. 8. Since the register AD103 stores an address in the column direction, the operations (1), (2) and (3) change the column address in the broken line area 81 of the second memory. Similarly, the register AD'102 stores an address in the row direction, and the operations (4), (5) and (6) change the row address. By combining one of the operations (1)-(3) and one of the operations (4)-(6), the memory positions in the second memory M2 which store the data from the first memory M1 can be freely defined.

A trigger circuit 111 produces a drive signal ("H" level) when its input signal changes from an "H" level to an "L" level. The drive signal activates a gate circuit 120 for transferring the transfer data from the first memory M1, which is temporarily stored in a register DATA 112, to a register DATA'113 through a data bus 140, in order to shift the same data to the second memory M2. Further, the drive signal drives a DMA execution register 109. As a result, gate circuits 114 and 115 are enabled to be coupled with an address bus (90 in FIG. 3) and a data bus (91 in FIG. 3) coupled to the second memory M2. Further, a timing signal generator 110 for controlling the timing of the address operation is activated. Another trigger circuit 116, like the trigger circuit 111, produces a drive signal (e.g. "H" level) when the input signal changes from "H" to "L" level. The timings in the operations of the registers D, DC, and D' are all controlled by the drive signal.

Assume now that a DMA REQUEST signal (corresponding to the signal 80 in FIG. 3) for requiring the DMA transfer is produced from a register DREQ 108 and is permitted by the CPU (61 in FIG. 3). Under this condition, a DMA transfer mode is set in the system. Firstly, the DMA transfer is performed between the first memory (62 in FIG. 3) and the second DMA controller (shown in FIG. 7). The transfer control is performed by the first DMA controller (63 in FIG. 3). The operation timings are similar to those during the period T1 in FIG. 6. As seen from FIG. 6, control signals outputted from the first DMA controller (63 in FIG. 3) are time-controlled during the corresponding periods. A read-out control signal (MR) for the first memory is produced during a period ranging from the second clock to the fourth clock; a write control signal (IOW) is produced for a period from the third to the fourth clock; and a DMA acknowledge signal (DACK) is produced for a period from the second clock to the fourth clock. A write control signal (IOW) for directing the writing of the contents of the first memory into the second DMA controller is applied to a NOR gate 127, during a predetermined period. This signal is transferred from the first DMA controller 63. Further, at this time, a DMA acknowledge signal (corresponding to 83 in FIG. 3) is also applied to the other input terminal of the same NOR gate 127. As a result, a gate circuit 119 is enabled, so that the contents of the first memory are stored from the data bus (71 in FIG. 3) into the register DATA 112.

The above process is executed for a period T1 in FIG. 6 and the phase of the DMA transfer process shifts to that during a period T2. At the initial stage in the period T2, the trigger circuit 111 has been producing a drive signal since the fourth clock during the period T1. Responsive to the gate circuit 120, the contents stored in the register DATA 112 are transferred to the register DATA' 113 through an internal bus 140. The DMA execution register 109 activates the timing signal generator 110 and produce a control signal to enable the gate circuit 115. At this time, an address for the second memory (65 in FIG. 3) previously stored in the register 102 through the internal bus 139, is applied to the second memory. Further, the timing signal generator 110 produces timing signals E1 to E4 for controlling the operation timing of the respective circuits (registers and gates). When the timing signal E3 of those signals is produced in synchronism with the third clock, the inverter 141 transfers a write control signal (MW) to the second memory. The timing signals E1 to E4 may be produced at different timings by using a frequency divider circuit or the like. The write control signal (MW) is transferred through the control signal bus (92 in FIG. 3). Further, since the OR gate 128 produces a control signal to enable the gate circuit 114, the contents of the first memory stored in the register DATA' 113 are written into the memory area of the second memory specified by the address of the register AD'102. This write operation is performed during the period of the third clock generation.

During the period T2, the DMA transfer is performed also between the first memory and the register DATA 112 of the second DMA controller. In response the next address (MD±1) produced from the first DMA controller, the contents read out from the first memory are loaded from the gate circuit 119 to the register DATA 112, through the data bus 138 (71 in FIG. 3). This is controlled by the third clock in the period T2. Incidentally, at this timing, the gate circuit 120 is disabled, so that the new contents stored in the register DATA 112 are not transferred to the register DATA' 113. Accordingly, when the contents written into the register DATA'113 at the period T1 are transferred to the second memory, the next content read out from the first memory is never transferred to the second memory concurrently. The next content written into the register DATA 112 is transferred to the register DATA'113 when the trigger circuit 111 is driven in the later half of the fourth clock for the period T2.

As a result, when the previous contents written into the second DMA controller are written into the second memory, the next contents may be read out from the first memory and set into the second DMA controller. Four clocks are satisfactory for a cycle of the DMA transfer for transferring one piece of the contents between the first and second memories. Therefore, the content of the memory transfer can sequentially be executed at a speed about two times as fast as the prior art data transfer. This is suitable for data processing requiring a high speed data transfer such as an image processing.

Even when addresses in a memory area of the second memory M2 into which the contents of the first memory M1 are written, as shown in FIG. 8, unsequentially change, the DMA transfer system of the present embodiment can write the contents into the second memory at a high speed without damaging the transfer speed. Assume now that the contents transferred from the first memory M1 are loaded into the memory area enclosed by the broken line 81 in the second memory M2. In this case, changes of the addresses for the second memory M2 are: X to X+15 in the first row in the area defined by the broken line, X+64 to X+79 in the second row, X+128 to X to 143 . . . , in the third row, . . ., X+8128 to X+8143 in the 128th row, where X is the lead address.

On the other hand, the prior DMA transfer system had to execute the DMA transfer instruction 128 times. Additionally, the prior system had to execute the processing to set the leading addresses (X, X+64, X+128, . . . , X+8128) for each row line of the second memory in the DMA controller at the start of each DMA transfer instruction. This was a major factor to remarkably reduce the speed of the DMA transfer.

The present embodiment solves all of those problems. In the present embodiment, a novel address designating section for the second memory is provided in the second DMA controller (FIG. 7). The address designating section is comprised of the address operation unit AU101, the AD and AD' registers 103 and 102, the P register 104, the DC register 105, the zero detectors 117 and 118, the D and D' registers 106 and 107, and the control circuit for those means (the address controller 100, the timing signal generator 110, the trigger circuit 116, and the gate circuits 121 to 137).

The leading address X is set in the AD and AD' registers 103 and 102. Then, the number 16 of the addresses in the broken line area 81 of the second memory in the row direction (the number of the addresses in the first memory in the row direction) is set in the D and D' registers 106 and 107. The number 128 of the addresses in the broken line area in the column direction (the number of the addresses of the first memory in the column direction) is set in the DC register 105. The number 64 of the addresses of the second memory in the row direction is set in the P register 104. As the state setting terminates, the DMA transfer starts.

As for the processing at the DMA transfer, the contents X of the AD' register 102 are transferred as an address to the second memory. The contents of the register DATA'113 are stored at the address X. Every time that the DMA acknowledge signal (DACK) outputted during the second to fourth clock cycles of each period changes from an "H" level to an "L" level, the trigger circuit 116 produces a one shot drive signal. In response to the drive signal, the content of the D register 106 is decremented one by one. The subtracting process is performed only when the zero detecting circuit 117 for detecting the contents of the D register does not detect zero. In the present embodiment, the −1 operation is executed 16 times. The contents of the AD' register 102 are incremented one by one by the address operation unit AU101 under control of the timing signal E4. The addition is performed once per period, like the operation of the D register. A numeral "1" applied to one of the inputs of the address operation unit AU101 is applied from the address controller to the C input of the address operation unit. In this way, the content of the AD' register 102 is changed from X, X+1, X+2, . . . , X+15, the contents of the first memory in the first row are sequentially written into the locations of the address X to X+15 (i.e. the first row of the broken line area) of the second memory. When the contents of the D register 106 becomes "0", the zero detector 117 produces a detected signal of an "H" level, for example. As a result, an output signal of the AND gate 133 becomes "H" in level, so that the gate circuit 121 is enabled and the contents of the D' register 107 are shifted to the D register 106. Further, an output signal of the AND gate 131 becomes "H" in level, so that the content of the DC register 105 is decremented by one. Simultaneously, the address controller 100 responds to the detected signal from the zero detector 117 to produce a control signal to enable the gate circuit 123. The gate circuit 124 is also enabled. As a result, the contents of the AD register 103 and the P register 104 are added in the address operation unit AU101, and the result of the addition is automatically set as X+64 in the AD register 103 and AD' register 102. Accordingly, the next contents read out from the DATA' register 113 are automatically written into the address X+64 of the second memory. The address coincides with the lead address in the broken line area 81 in the second row. Subsequently, similar operations are repeated. After the content of the final address of the first memory is written in the second memory, the zero detectors 117 and 118 produce "H" level signals and hence a control signal for resetting the DREQ register 108 is produced through the AND gate 129. As a result, the DMA request signal (DMA REQUEST) is removed to complete the DMA transfer. At this time, the first DMA controller (63 in FIG. 3) recognizes that the second DMA controller has completed the contents transfer to the second memory. The first DMA controller judges that there is no processing not yet executed and informs the CPU of the end of the DMA transfer.

As described above, according to the present embodiment, by only executing the DMA transfer instruction one time, the DMA transfer system can automatically follow a change of addresses in the memory of which addresses unsequentially change, and execute the data transfer. Therefore, a high speed DMA transfer is possible and adaptable satisfactorily for the image processing.

While the DMA transfer from the first memory to the second memory has been described in the above-mentioned embodiment, the present invention is of course applicable for the DMA transfer from the second memory to the first memory. In this case, the second controller produces a read control signal toward the second memory, and the bus 140 and the DATA and DATA' registers may be bidirectionally controlled. In the embodiment, the data transfer is directed from "left to right" in the memory. It is evident, however, that the transfer direction may be "right to left", "top to bottom", "bottom to top" or the like, if the control mode of the address control system is properly changed. When the addresses of the memory to which the data are transferred are sequentially arranged, the above-mentioned processing system may be omitted. When an arrangement of the addresses of the memory to which the data is transferred is discontinuous, and a high speed transfer is not required, either of the DATA register or the DATA' register is omissible. The DMA transfer may be applied for devices other than memories. A DMA transfer among three or more locations may be realized in a manner that a controller equivalent to the second controller is coupled to the second memory and to a third memory. The present invention is not limited to the DMA transfer. For example, a data transfer circuitry of the present invention may be installed in the CPU.

What is claimed is:

1. An information processing apparatus, comprising:
a central processing unit;
a first address bus and a first data bus coupled to said central processing unit;
a transfer unit having data to be transferred, said transfer unit comprising a first memory coupled to said first address bus and said first data bus;
a first controller coupled to said first address bus and said first data bus;
a storing unit, said storing unit comprising a second controller having first and second registers, said first register being coupled to said first memory via said first data bus;
coupling means for coupling said first register to said second register;
a receiver unit for receiving data transferred from said transfer unit, said receiver unit comprising a second memory;
a second address bus and a second data bus for coupling said second memory and said second controller, said second register being coupled to said second memory via said second data bus;
said first controller comprising means for controlling a data transfer from said first memory to said second memory by providing a first address through said first address bus to said first memory for reading a first data out of said first memory, the read-out first data being stored in said first register via said first data bus, said second controller including means for transferring said first data from said first register to said second register while said first controller transfers a second address to said first memory for reading out a second data; and
said second controller further comprising means for transferring said first data from said second register to said second memory via said second data bus while the read-out second data from said first memory is simultaneously stored into said first register.

* * * * *